US012142232B2

(12) United States Patent
Lee et al.

(10) Patent No.: US 12,142,232 B2
(45) Date of Patent: Nov. 12, 2024

(54) DISPLAY DEVICE

(71) Applicant: LG ELECTRONICS INC., Seoul (KR)

(72) Inventors: Kyong Hoon Lee, Seoul (KR); Jae Bong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/141,943

(22) Filed: May 1, 2023

(65) Prior Publication Data

US 2024/0112643 A1 Apr. 4, 2024

(30) Foreign Application Priority Data

Oct. 4, 2022 (KR) ........................ 10-2022-0126096

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2320/0646* (2013.01); *G09G 2320/0686* (2013.01); *G09G 2330/045* (2013.01)

(58) Field of Classification Search
CPC ................... G09G 3/3426; G09G 3/36; G09G 2320/0646; G09G 2320/0686; G09G 2330/045
See application file for complete search history.

(56) References Cited

U.S. PATENT DOCUMENTS 9,880,800 B1 * 1/2018 Knepper ............... G06F 3/0482
11,227,556 B1 1/2022 Kim et al.
2005/0265051 A1 12/2005 Yamamoto et al.
2006/0092346 A1 5/2006 Moon et al.
2009/0121652 A1 * 5/2009 Kang ................ G02F 1/133603 315/297
2011/0050743 A1 * 3/2011 Park ..................... G09G 3/3666 345/690
2019/0339573 A1 * 11/2019 Wu ........................ H05B 45/00

FOREIGN PATENT DOCUMENTS

KR 1020170114813 10/2017

OTHER PUBLICATIONS

European Patent Office Application Serial No. 23168363.2, Search Report dated Dec. 8, 2023, 4 pages.
Korean Intellectual Property Office Application No. 10-2022-0126096, Office Action dated Nov. 20, 2023, 2 pages.
European Patent Office Application Serial No. 23168363.2, Search Report dated Apr. 11, 2024, 14 pages.

* cited by examiner

*Primary Examiner* — Gene W Lee
(74) *Attorney, Agent, or Firm* — LEE, HONG, DEGERMAN, KANG & WAIMEY

(57) ABSTRACT

According to an embodiment of the present disclosure, a display device includes a liquid crystal display panel; and a backlight unit configured to supply light to the liquid crystal display panel, wherein the backlight unit includes a light source array including a plurality of blocks each including a plurality of light sources, and a light source driver configured to control the plurality of blocks, the plurality of blocks are divided into a plurality of groups, and blocks belonging to a same group are arranged consecutively in a vertical direction.

7 Claims, 18 Drawing Sheets

(a) (b)

1000

1010

1020

1030

1040

| | #01 | #02 | #03 | #04 | #05 | #06 | #07 | #08 | #09 | #10 |
|---|---|---|---|---|---|---|---|---|---|---|
| #01 | 1 | 1 | 1 | 1 | 1 | 1 | 1 | 17 | 19 | 21 |
| #02 | 2 | 2 | 2 | 2 | 2 | 2 | 2 | 18 | 20 | 22 |
| #03 | 3 | 3 | 3 | 3 | 3 | 3 | 3 | 19 | 21 | 23 |
| #04 | 4 | 4 | 4 | 4 | 4 | 4 | 4 | 20 | 22 | 17 |
| #05 | 5 | 5 | 5 | 5 | 5 | 5 | 5 | 21 | 23 | 18 |
| #06 | 6 | 6 | 6 | 6 | 6 | 6 | 6 | 22 | 17 | 19 |
| #07 | 7 | 7 | 7 | 7 | 7 | 7 | 7 | 23 | 18 | 20 |
| #08 | 8 | 8 | 8 | 8 | 8 | 8 | 8 | 17 | 19 | 21 |
| #09 | 9 | 9 | 9 | 9 | 9 | 9 | 9 | 18 | 20 | 22 |
| #10 | 10 | 10 | 10 | 10 | 10 | 10 | 10 | 19 | 21 | 23 |
| #11 | 11 | 11 | 11 | 11 | 11 | 11 | 11 | 20 | 22 | 17 |
| #12 | 12 | 12 | 12 | 12 | 12 | 12 | 12 | 21 | 23 | 18 |
| #13 | 13 | 13 | 13 | 13 | 13 | 13 | 13 | 22 | 17 | 19 |
| #14 | 14 | 14 | 14 | 14 | 14 | 14 | 14 | 23 | 18 | 20 |
| #15 | 15 | 15 | 15 | 15 | 15 | 15 | 15 | 17 | 19 | 21 |
| #16 | 16 | 16 | 16 | 16 | 16 | 16 | 16 | 18 | 20 | 22 |

| | #01 | #02 | #03 | #04 | #05 | #06 | #07 | #08 | #09 | #10 |
|---|---|---|---|---|---|---|---|---|---|---|
| #01 | 1 | 1 | 1 | 17 | 19 | 21 | 1 | 1 | 1 | 1 |
| #02 | 2 | 2 | 2 | 18 | 20 | 22 | 2 | 2 | 2 | 2 |
| #03 | 3 | 3 | 3 | 19 | 21 | 23 | 3 | 3 | 3 | 3 |
| #04 | 4 | 4 | 4 | 20 | 22 | 13 | 4 | 4 | 4 | 4 |
| #05 | 5 | 5 | 5 | 21 | 23 | 14 | 5 | 5 | 5 | 5 |
| #06 | 6 | 6 | 6 | 22 | 17 | 15 | 6 | 6 | 6 | 6 |
| #07 | 7 | 7 | 7 | 23 | 18 | 16 | 7 | 7 | 7 | 7 |
| #08 | 8 | 8 | 8 | 17 | 19 | 21 | 8 | 8 | 8 | 8 |
| #09 | 9 | 9 | 9 | 18 | 20 | 22 | 9 | 9 | 9 | 9 |
| #10 | 10 | 10 | 10 | 19 | 21 | 23 | 10 | 10 | 10 | 10 |
| #11 | 11 | 11 | 11 | 20 | 22 | 13 | 11 | 11 | 11 | 11 |
| #12 | 12 | 12 | 12 | 21 | 23 | 14 | 12 | 12 | 12 | 12 |
| #13 | 13 | 13 | 13 | 22 | 15 | 15 | 13 | 13 | 13 | 13 |
| #14 | 14 | 14 | 14 | 23 | 16 | 16 | 14 | 14 | 14 | 14 |
| #15 | 15 | 15 | 15 | 15 | 15 | 21 | 15 | 15 | 15 | 15 |
| #16 | 16 | 16 | 16 | 16 | 16 | 22 | 16 | 16 | 16 | 16 |

| | #01 | #02 | #03 | #04 | #05 | #06 | #07 | #08 | #09 | #10 |
|---|---|---|---|---|---|---|---|---|---|---|
| #01 | 1 | 17 | 10 | 3 | 19 | 12 | 5 | 21 | 14 | 7 |
| #02 | 2 | 18 | 11 | 4 | 20 | 13 | 6 | 22 | 15 | 8 |
| #03 | 3 | 19 | 12 | 5 | 21 | 14 | 7 | 23 | 16 | 9 |
| #04 | 4 | 20 | 13 | 6 | 22 | 15 | 8 | 1 | 17 | 10 |
| #05 | 5 | 21 | 14 | 7 | 23 | 16 | 9 | 2 | 18 | 11 |
| #06 | 6 | 22 | 15 | 8 | 1 | 17 | 10 | 3 | 19 | 12 |
| #07 | 7 | 23 | 16 | 9 | 2 | 18 | 11 | 4 | 20 | 13 |
| #08 | 8 | 1 | 17 | 10 | 3 | 19 | 12 | 5 | 21 | 14 |
| #09 | 9 | 2 | 18 | 11 | 4 | 20 | 13 | 6 | 22 | 15 |
| #10 | 10 | 3 | 19 | 12 | 5 | 21 | 14 | 7 | 23 | 16 |
| #11 | 11 | 4 | 20 | 13 | 6 | 22 | 15 | 8 | 1 | 17 |
| #12 | 12 | 5 | 21 | 14 | 7 | 23 | 16 | 9 | 2 | 18 |
| #13 | 13 | 6 | 22 | 15 | 8 | 1 | 17 | 10 | 3 | 19 |
| #14 | 14 | 7 | 23 | 16 | 9 | 2 | 18 | 11 | 4 | 20 |
| #15 | 15 | 8 | 1 | 17 | 10 | 3 | 19 | 12 | 5 | 21 |
| #16 | 16 | 9 | 2 | 18 | 11 | 4 | 20 | 13 | 6 | 22 |

(a)

(b)

| | #01 | #02 | #03 | #04 | #05 | #06 | #07 | #08 | #09 | #10 |
|---|---|---|---|---|---|---|---|---|---|---|
| #01 | 1 | 17 | 10 | 3 | 19 | 12 | 5 | 21 | 14 | 7 |
| #02 | 2 | 18 | 11 | 4 | 20 | 13 | 6 | 22 | 15 | 8 |
| #03 | 3 | 19 | 12 | 5 | 21 | 14 | 7 | 23 | 16 | 9 |
| #04 | 4 | 20 | 13 | 6 | 22 | 15 | 8 | 1 | 17 | 10 |
| #05 | 5 | 21 | 14 | 7 | 23 | 16 | 9 | 2 | 18 | 11 |
| #06 | 6 | 22 | 15 | 8 | 1 | 17 | 10 | 3 | 19 | 12 |
| #07 | 7 | 23 | 16 | 9 | 2 | 18 | 11 | 4 | 20 | 13 |
| #08 | 8 | 1 | 17 | 10 | 3 | 19 | 12 | 5 | 21 | 14 |
| #09 | 9 | 2 | 18 | 11 | 4 | 20 | 13 | 6 | 22 | 15 |
| #10 | 10 | 3 | 19 | 12 | 5 | 21 | 14 | 7 | 23 | 16 |
| #11 | 11 | 4 | 20 | 13 | 6 | 22 | 15 | 8 | 1 | 17 |
| #12 | 12 | 5 | 21 | 14 | 7 | 23 | 16 | 9 | 2 | 18 |
| #13 | 13 | 6 | 22 | 15 | 8 | 1 | 17 | 10 | 3 | 19 |
| #14 | 14 | 7 | 23 | 16 | 9 | 2 | 18 | 11 | 4 | 20 |
| #15 | 15 | 8 | 1 | 17 | 10 | 3 | 19 | 12 | 5 | 21 |
| #16 | 16 | 9 | 2 | 18 | 11 | 4 | 20 | 13 | 6 | 22 |

(a)

(b)

| | #01 | #02 | #03 | #04 | #05 | #06 | #07 | #08 | #09 | #10 |
|---|---|---|---|---|---|---|---|---|---|---|
| #01 | 1 | 17 | 10 | 3 | 19 | 12 | 5 | 21 | 14 | 7 |
| #02 | 2 | 18 | 11 | 4 | 20 | 13 | 6 | 22 | 15 | 8 |
| #03 | 3 | 19 | 12 | 5 | 21 | 14 | 7 | 23 | 16 | 9 |
| #04 | 4 | 20 | 13 | 6 | 22 | 15 | 8 | 1 | 17 | 10 |
| #05 | 5 | 21 | 14 | 7 | 23 | 16 | 9 | 2 | 18 | 11 |
| #06 | 6 | 22 | 15 | 8 | 1 | 17 | 10 | 3 | 19 | 12 |
| #07 | 7 | 23 | 16 | 9 | 2 | 18 | 11 | 4 | 20 | 13 |
| #08 | 8 | 1 | 17 | 10 | 3 | 19 | 12 | 5 | 21 | 14 |
| #09 | 9 | 2 | 18 | 11 | 4 | 20 | 13 | 6 | 22 | 15 |
| #10 | 10 | 3 | 19 | 12 | 5 | 21 | 14 | 7 | 23 | 16 |
| #11 | 11 | 4 | 20 | 13 | 6 | 22 | 15 | 8 | 1 | 17 |
| #12 | 12 | 5 | 21 | 14 | 7 | 23 | 16 | 9 | 2 | 18 |
| #13 | 13 | 6 | 22 | 15 | 8 | 1 | 17 | 10 | 3 | 19 |
| #14 | 14 | 7 | 23 | 16 | 9 | 2 | 18 | 11 | 4 | 20 |
| #15 | 15 | 8 | 1 | 17 | 10 | 3 | 19 | 12 | 5 | 21 |
| #16 | 16 | 9 | 2 | 18 | 11 | 4 | 20 | 13 | 6 | 22 |

(a)

(b)

| | #01 | #02 | #03 | #04 | #05 | #06 | #07 | #08 | #09 | #10 |
|---|---|---|---|---|---|---|---|---|---|---|
| #01 | 1 | 17 | 10 | 3 | 19 | 12 | 5 | 21 | 14 | 7 |
| #02 | 2 | 18 | 11 | 4 | 20 | 13 | 6 | 22 | 15 | 8 |
| #03 | 3 | 19 | 12 | 5 | 21 | 14 | 7 | 23 | 16 | 9 |
| #04 | 4 | 20 | 13 | 6 | 22 | 15 | 8 | 1 | 17 | 10 |
| #05 | 5 | 21 | 14 | 7 | 23 | 16 | 9 | 2 | 18 | 11 |
| #06 | 6 | 22 | 15 | 8 | 1 | 17 | 10 | 3 | 19 | 12 |
| #07 | 7 | 23 | 16 | 9 | 2 | 18 | 11 | 4 | 20 | 13 |
| #08 | 8 | 1 | 17 | 10 | 3 | 19 | 12 | 5 | 21 | 14 |
| #09 | 9 | 2 | 18 | 11 | 4 | 20 | 13 | 6 | 22 | 15 |
| #10 | 10 | 3 | 19 | 12 | 5 | 21 | 14 | 7 | 23 | 16 |
| #11 | 11 | 4 | 20 | 13 | 6 | 22 | 15 | 8 | 1 | 17 |
| #12 | 12 | 5 | 21 | 14 | 7 | 23 | 16 | 9 | 2 | 18 |
| #13 | 13 | 6 | 22 | 15 | 8 | 1 | 17 | 10 | 3 | 19 |
| #14 | 14 | 7 | 23 | 16 | 9 | 2 | 18 | 11 | 4 | 20 |
| #15 | 15 | 8 | 1 | 17 | 10 | 3 | 19 | 12 | 5 | 21 |
| #16 | 16 | 9 | 2 | 18 | 11 | 4 | 20 | 13 | 6 | 22 |

(a)

(b)

DISPLAY DEVICE

CROSS-REFERENCE TO RELATED APPLICATION(S)

Pursuant to 35 U.S.C. § 119(a), this application claims the benefit of earlier filing date and right of priority to Korean Patent Application No. 10-2022-0126096, filed on Oct. 4, 2022, the contents of which are hereby incorporated by reference herein in its entirety.

BACKGROUND OF THE INVENTION

1. Field of the Invention

The present disclosure relates to a display device. Specifically, the present disclosure relates to a structure of a backlight unit that emits light toward a liquid crystal display panel.

2. Discussion of the Related Art

Users' interest and desire for high contrast ratio and excellent color gamut continues, and development of relevant technology continues. In this regard, a display device using mini LEDs has recently been released.

The mini LEDs have about one-tenth the size of conventional LEDs, and allow for more precise control of light, realizing a clearer and brighter screen. Thousands to tens of thousands of mini LEDs may be provided in a single display device, although depending on a screen size. Therefore, structures in which these mini LEDs are arranged, methods of controlling mini LEDs, and the like are almost limitless.

Meanwhile, the display device supports a local dimming function for the purpose of improving the contrast ratio or the like. Accordingly, an effective arrangement structure and control method of mini LEDs in a display device supporting a local dimming function may be required.

SUMMARY OF THE INVENTION

The present disclosure minimizes the problem of heat generation in a backlight unit in a display device using a mini LED as a light source.

The present disclosure provides an efficient arrangement method while reducing the stress of driving devices for controlling a plurality of light sources.

According to an embodiment of the present disclosure, a display device includes a liquid crystal display panel; and a backlight unit configured to supply light to the liquid crystal display panel, wherein the backlight unit includes a light source array including a plurality of blocks each including a plurality of light sources, and a light source driver configured to control the plurality of blocks, the plurality of blocks are divided into a plurality of groups, and blocks belonging to a same group are arranged consecutively in a vertical direction.

The blocks belonging to the same group may be arranged such that the number of consecutive blocks in a horizontal direction is fewer than the number of consecutive blocks in the vertical direction.

The blocks belonging to the same group may be arranged not to be consecutive in the horizontal direction.

The blocks belonging to the same group may be arranged such that a predetermined number or more of blocks are not consecutive in the horizontal direction.

The light source driver may include a plurality of driving devices corresponding to each of the plurality of groups, and the display device may further include a light source circuit board, on one surface of which the light source array are mounted and on the other surface of which the plurality of driving devices are mounted.

Each of the plurality of driving devices may be disposed so as not to overlap blocks of a corresponding group.

The plurality of driving devices may be arranged in a line.

The plurality of driving devices may be arranged in a line while each of the plurality of driving devices does not overlap blocks of a corresponding group.

A plurality of signal transfer connectors may be formed on the light source circuit board, and the plurality of signal transfer connectors may be arranged in different directions.

According to the embodiments of the present disclosure, since the blocks of the same group are consecutively arranged in the vertical direction, a problem of the load being biased on some driving devices is minimized, and heat generated in the driving device is dispersed, resulting in minimization in the overall heat generation of a product.

According to an embodiment of the present disclosure, all first blocks of blocks respectively controlled by driving devices may be located in first rows, and accordingly, the driving order is uniformly designed, thereby securing the ease of design and control.

According to an embodiment of the present disclosure, since the driving device and the blocks of a corresponding group are arranged in non-overlapping areas, the problem of overlapping of heat generated by the light source and heat generated by the driving device is minimized and a problem in which the PCB artwork is complicated and processing of a relevant machine is difficult is solved.

According to an embodiment of the present disclosure, since the signal transfer connectors are disposed in different directions, the convenience of PCB artwork is improved and degradation in signal quality is prevented.

DETAILED DESCRIPTION OF THE PREFERRED EMBODIMENTS

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

Terms including ordinal numbers such as first and second may be used to describe various elements, but the elements are not limited by the terms. The terms are only used for the purpose of distinguishing one component from another component.

The singular expression includes the plural expression unless the context clearly dictates otherwise.

In the present application, terms such as "comprises" or "have" are intended to designate that a feature, number, step, operation, component, part, or combination thereof described in the specification exists, but one or more other features It should be understood that this does not preclude the existence or addition of numbers, steps, operations, components, parts, or combinations thereof.

Figure 1:
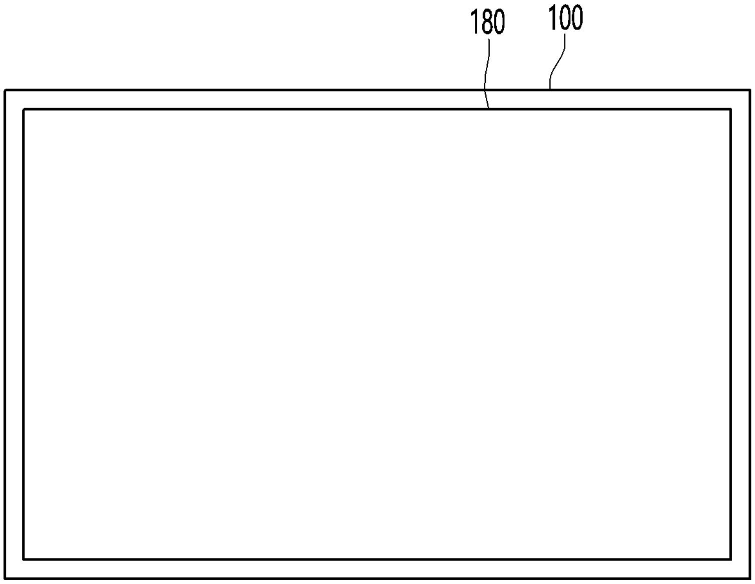
FIG. 1 is a diagram illustrating a display device according to an embodiment of the present disclosure.

FIG. 1 is a diagram illustrating a display device according to an embodiment of the present invention.

With reference to the drawings, a display device 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (OLED) panel (ILED panel).

According to the present disclosure, the display 180 includes a liquid crystal display panel (LCD panel). Hereinafter, the display device 100 may be a liquid crystal display device.

On the other hand, examples of the display device 100 in FIG. 1 include a monitor, a TV, a tablet PC, a mobile terminal, and so on.

Figure 2:
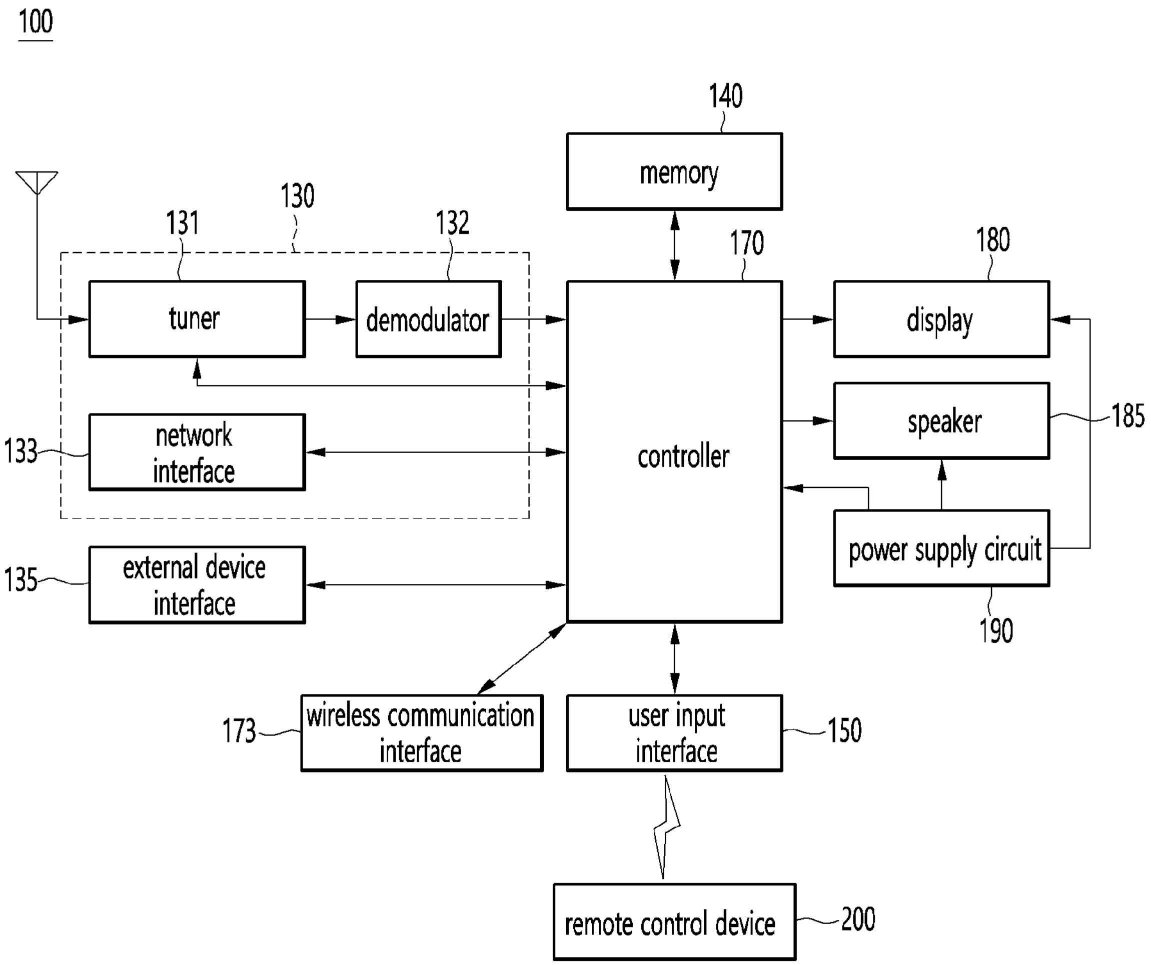
FIG. 2 is a block diagram showing a configuration of the display device of FIG. 1.

FIG. 2 is a block diagram illustrating the configuration of the display device of FIG. 1.

FIG. 2 is a block diagram showing a configuration of a display device according to an embodiment of the present disclosure.

Referring to FIG. 2, a display device 100 can include a broadcast receiver 130, an external device interface 135, a memory 140, a user input interface 150, a controller 170, a wireless communication interface 173, a display 180, a speaker 185, and a power supply circuit 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an application or an application list in an adjacent external device and deliver it to the controller 170 or the memory 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the speaker 185.

An external device connectable to the external device interface 135 can be one of a set-top box, a Blu-ray player, a DVD player, a game console, a sound bar, a smartphone, a PC, a USB Memory, and a home theater system but this is just exemplary.

The network interface 133 can provide an interface for connecting the display device 100 to a wired/wireless network including internet network. The network interface 133 can transmit or receive data to or from another user or another electronic device through an accessed network or another network linked to the accessed network.

In addition, some content data stored in the display device 100 may be transmitted to a selected user or a selected electronic device among another user registered in advance in the display device 100 or other electronic devices.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The memory 140 can store signal-processed image, voice, or data signals stored by a program in order for each signal processing and control in the controller 170.

Additionally, the memory 140 can perform a function for temporarily store image, voice, or data signals outputted from the external device interface 135 or the network interface 133 and can store information on a predetermined image through a channel memory function.

The memory 140 can store an application or an application list inputted from the external device interface 135 or the network interface 133.

The display device 100 can play content files (for example, video files, still image files, music files, document files, application files, and so on) stored in the memory 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the speaker 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the speaker 185.

Additionally, according to an external device image playback command received through the user input interface 150, the controller 170 can output image signals or voice signals of an external device such as a camera or a camcorder, which are inputted through the external device interface 135, through the display 180 or the speaker 185.

Moreover, the controller 170 can control the display 180 to display images and control broadcast images inputted through the tuner 131, external input images inputted through the external device interface 135, images inputted through the network interface, or images stored in the memory 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100.

Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 2 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 2, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 2, an image processing device such as the separated set-top box, and a content playback device including the display 180 and the speaker 185.

The speaker 185 receives the audio processed signal from the controller 170 and outputs the sound.

The power supply circuit 190 supplies the corresponding power throughout the display device 100. In particular, the power supply circuit 190 supplies power to the controller 170 that can be implemented in the form of a System On Chip (SOC), a display 180 for displaying an image, and the speaker 185 for outputting audio or the like.

Specifically, the power supply circuit 190 may include a converter for converting an AC power source into a DC power source, and a DC/DC converter for converting a level of the DC source power.

The remote controller 200 transmits a user input to a user input interface 150. To this end, the remote controller 200 may employ Bluetooth, radio frequency (RF) communication, infrared communication, ultra wideband, or ZigBee. Alternatively, the remote controller 200 may receive an image, a voice, or a data signal output from the user input interface 150, may display the image, the voice, or the data signal to the remote controller 200, and may output voice.

Figure 3:
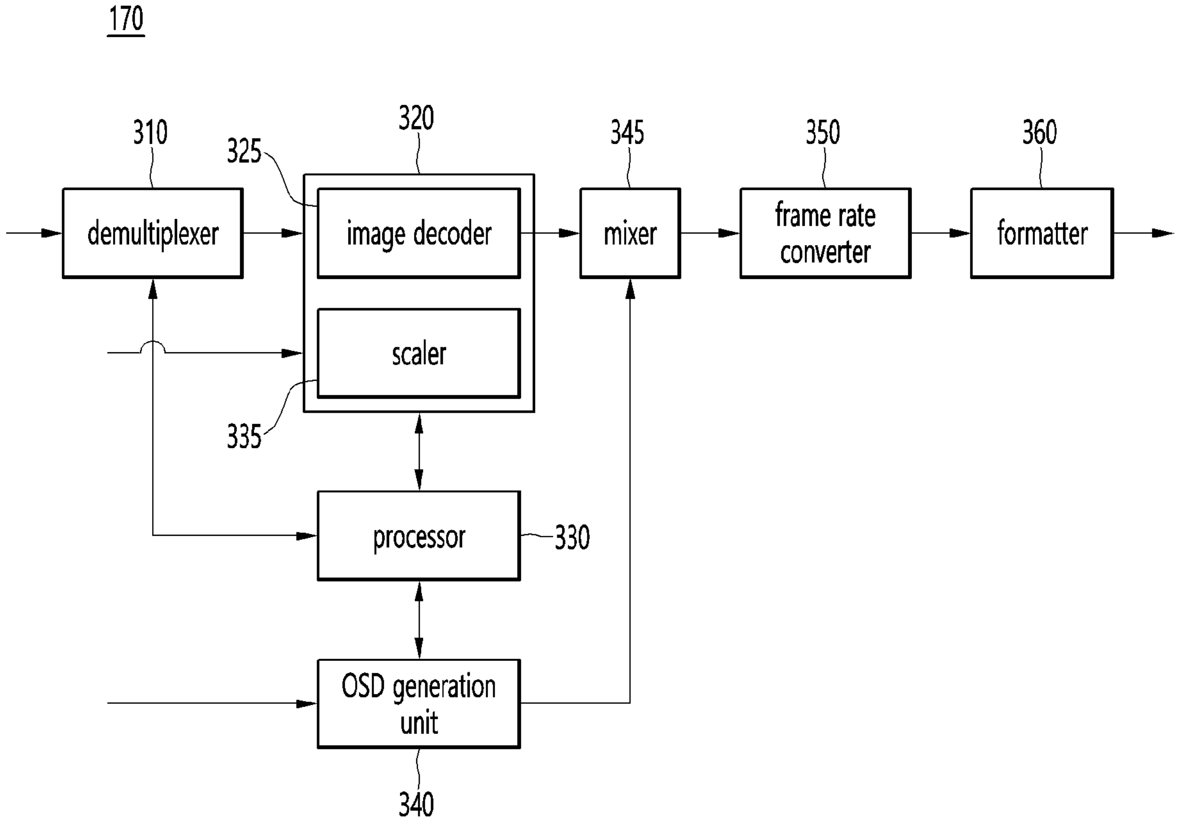
FIG. 3 is an example of an internal block diagram of a controller of FIG. 2.

FIG. 3 is an example of a block diagram of the inside of a controller in FIG. 2.

For description with reference to the drawings, the controller 170 according to an embodiment of the present invention includes a demultiplexer 310, an image processing unit 320, a processor 330, an OSD generation unit 340, a mixer 345, a frame rate converter 350, and a formatter 360. In addition, an audio processing unit (not illustrated) and a data processing unit (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner 131, the demodulator 132, or the external device interface 135.

The image processing unit 320 performs image processing of the image signal that results from the demultiplexing. To do this, the image processing unit 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the display device 100 or within the controller 170. For example, the processor 330 controls the tuner unit 110 in such a manner that the tuner unit 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 133 or the external device interface 135.

In addition, the processor 330 controls operation of each of the demultiplexer 310, the image processing unit 320, the OSD generation unit 340, and so on within the controller 170.

The OSD generation unit 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generation unit 340 generates a pointer possibly displayed on the display. Particularly, the pointer is generated in a pointing signal processing unit, and an OSD generation unit 340 includes the pointing signal processing unit (not illustrated). Of course, it is also possible that instead of being providing within the OSD generation unit 340, the pointing signal processing unit (not illustrated) is provided separately.

The mixer 345 mixes the OSD signal generated in the OSD generation unit 340, and the image signal that results from the image processing and the decoding in the image processing unit 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processing unit (not illustrated) within the controller 170 performs audio processing of an audio signal that results from the demultiplexing. To do this, the audio processing unit (not illustrated) includes various decoders.

In addition, the audio processing unit (not illustrated) within the controller 170 performs processing for base, treble, volume adjustment and so on.

The data processing unit (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4A:
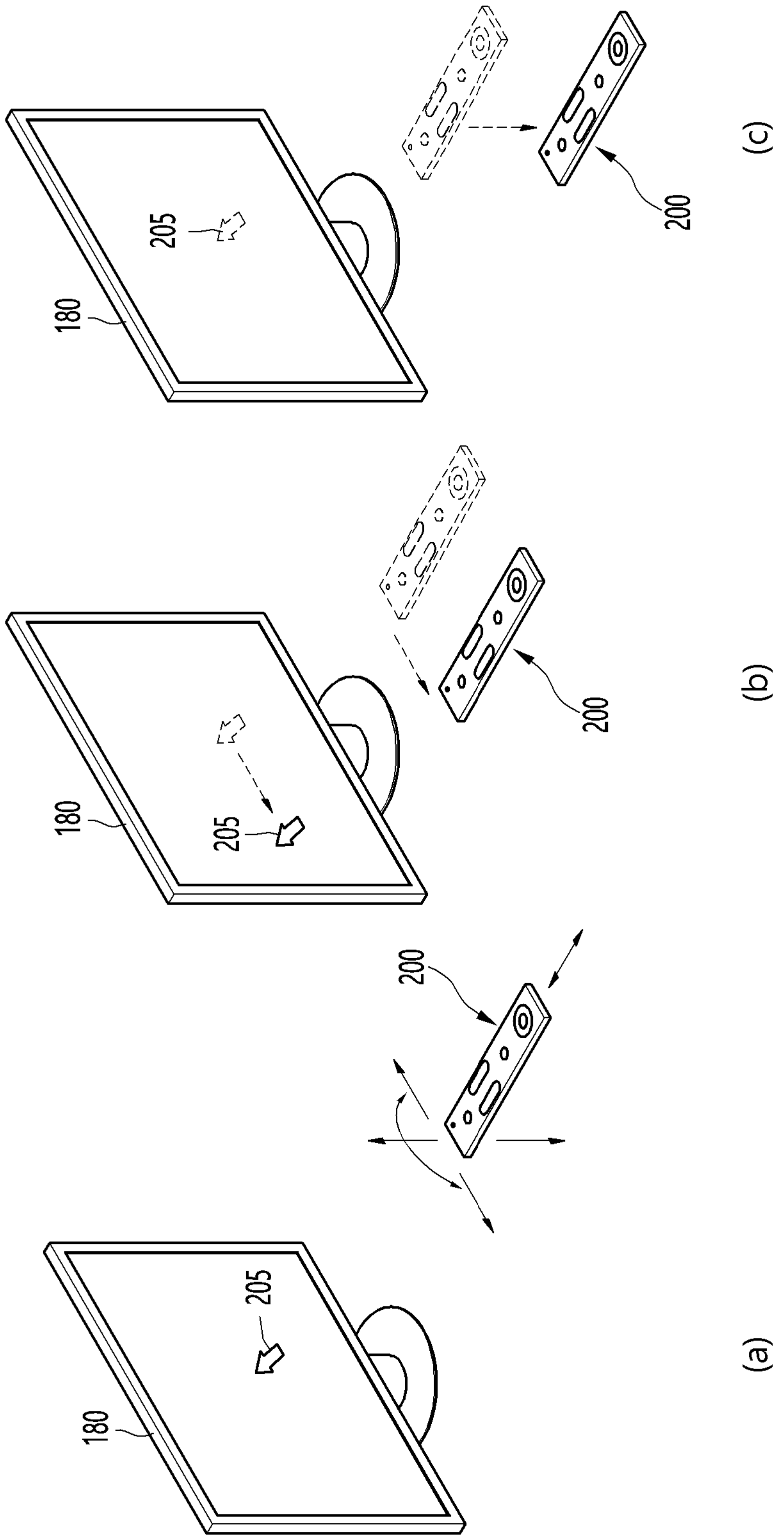
FIG. 4A is a diagram illustrating a control method for a remote control device of FIG. 2.

FIG. 4A is a diagram illustrating a method in which the remote controller in FIG. 2 performs control.

In FIG. 4A(a), it is illustrated that a pointer 205 which corresponds to the remote controller 200 is displayed on the display 180.

The user moves or rotates the remote controller 200 upward and downward, leftward and rightward (FIG. 4A(b)), and forward and backward (FIG. 4A(c)). The pointer 205 displayed on the display 180 of the display device corresponds to movement of the remote controller 200. As in the drawings, movement of the pointer 205, which depends on the movement of the remote controller 200 in a 3D space, is displayed and thus, the remote controller 200 is named a spatial remote controller or a 3D pointing device.

FIG. 4A(b) illustrates that, when the user moves the remote controller 200 leftward, the pointer 205 displayed on the display 180 of the display device correspondingly moves leftward.

Information on the movement of the remote controller 200, which is detected through a sensor of the remote controller 200, is transferred to the display device. The display device calculates the information on the movement of the remote controller 200 from coordinates of the pointer 205. The display device displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner. Conversely, in a case where the user causes the remote controller 200 to approach the display 180, the selection area within the display 180, which corresponds to the pointer 205, is zoomed out so that the selection is displayed in a reduced manner. On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Figure 4B:
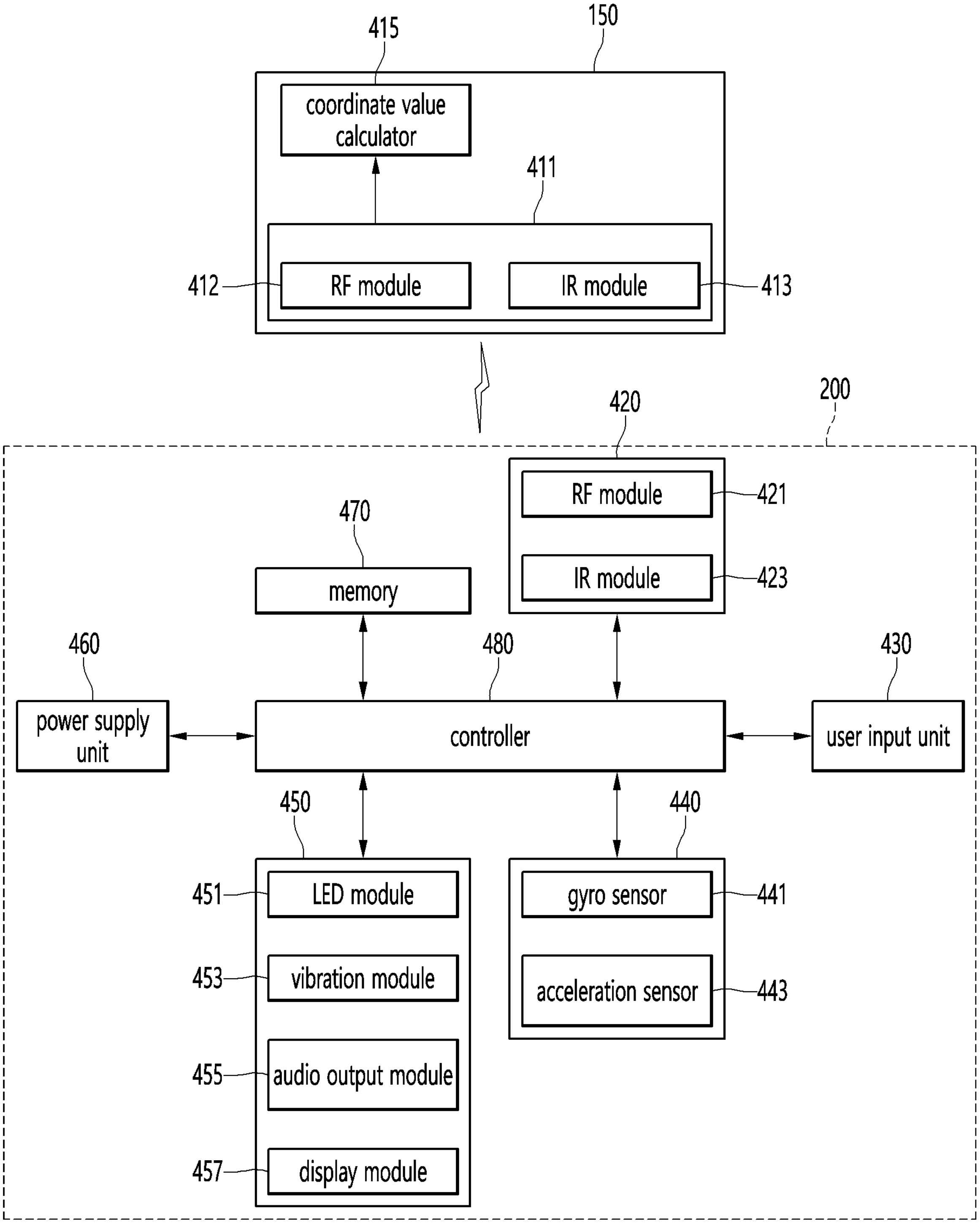
FIG. 4B is an internal block diagram of the remote control device of FIG. 2.

FIG. 4B is a block diagram of the inside of the remote controller in FIG. 2.

For description with reference to the drawings, the remote controller 200 includes a wireless communication unit 420, a user input unit 430, a sensor unit 440, an output unit 450, a power supply unit 460, a memory 470, and a controller 480.

The wireless communication unit 420 transmits and receives a signal to and from an arbitrary one of the display devices according to the embodiments of the present invention, which are described above. Of the display devices according to the embodiments of the present invention, one display device is taken as an example for description.

According to the present embodiment, the remote controller 200 includes an RF module 421 that transmits and receives a signal to and from the display device 100 in compliance with RF communication standards. In addition, the remote controller 200 includes an IR module 423 that possibly transmits and receives a signal to and from the display device 100 in compliance with IR communication standards.

According to the present embodiment, the remote controller 200 transfers a signal containing information on the movement of the remote controller 200 to the display device 100 through the RF module 421.

In addition, the remote controller 200 receives a signal transferred by the display device 100, through the RF module 421. In addition, the remote controller 200 transfers a command relating to power-on, power-off, a channel change, or a volume change, to the display device 100, through the IR module 423, whenever needed.

The user input unit 430 is configured with a keypad, buttons, a touch pad, a touch screen, or so on. The user inputs a command associated with the display device 100 into the remote controller 200 by operating the user input unit 430. In a case where the user input unit 430 is equipped with a physical button, the user inputs the command associated with the display device 100 into the remote controller 200 by performing an operation of pushing down the physical button. In a case where the user input unit 430 is equipped with a touch screen, the user inputs the command associated with the display device 100 into the remote controller 200 by touching on a virtual key of the touch screen. In addition, the user input unit 430 may be equipped with various types of input means operated by the user, such as a scroll key or a jog key, and the present embodiment does not impose any limitation on the scope of the present invention.

The sensor unit 440 includes a gyro sensor 441 or an acceleration sensor 443. The gyro sensor 441 senses information on the movement of the remote controller 200.

As an example, the gyro sensor 441 senses the information on operation of the remote controller 200 on the x-, y-, and z-axis basis. The acceleration sensor 443 senses information on the moving speed and so on of the remote controller 200. On the other hand, a distance measurement sensor is further included. Accordingly, a distance to the display 180 is sensed.

The output unit 450 outputs an image or an audio signal that corresponds to the operating of the user input unit 430 or corresponds to a signal transferred by the display device 100. Through the output unit 450, the user recognizes whether or not the user input unit 430 is operated or whether or not the display device 100 is controlled.

As an example, the output unit 450 includes an LED module 451, a vibration module 453, an audio output module 455, or a display module 457. The LED module 451, the vibration module 453, the audio output module 455, and the display module 457 emits light, generates vibration, outputs audio, or outputs an image, respectively, when the input unit 435 is operated, or a signal is transmitted and received to and from the display device 100 through a wireless communication unit 420.

The power supply unit 460 supplies a power to the remote controller 200. In a case where the remote controller 200 does not move for a predetermined time, the power supply unit 460 reduces power consumption by interrupting power supply. In a case where a predetermined key provided on the remote controller 200 is operated, the power supply unit 460 resumes the power supply.

Various types of programs, pieces of application data, and so on that are necessary for control or operation of the remote controller 200 are stored in the memory 470. In a case where the remote controller 200 transmits and receives a signal to and from the display device 100 in a wireless manner through the RF module 421, the signal is transmitted and received in a predetermined frequency band between the remote controller 200 and the display device 100. The controller 480 of the remote controller 200 stores information on, for example, a frequency band in which data is transmitted and received in a wireless manner to and from the display device 100 paired with the remote controller 200, in the memory 470, and makes a reference to the stored information.

The controller 480 controls all operations associated with the control by the remote controller 200. The controller 480 transfers a signal that corresponds to operating of a predetermined key of the user input unit 430, or a signal that corresponds to the movement of the remote controller 200, which is sensed in the sensor unit 440, to the display device 100 through the wireless communication unit 420.

A user input interface 150 of the display device 100 includes a wireless communication unit 411 that transmits and receives a signal in a wireless manner to and from the remote controller 200, and a coordinate value calculator 415 that calculates a coordinate value of the pointer, which corresponds to the operation of the remote controller 200.

The user input interface 150 transmits and receives the signal in a wireless manner to and from the remote controller 200 through the RF module 412. In addition, a signal transferred in compliance with the IR communication standards by the remote controller 200 through the IR module 413 is received.

The coordinate value calculator 415 calculates a coordinate value (x, y) of the pointer 205 to be displayed on the display 180, which results from compensating for a hand movement or an error, from a signal that corresponds to the operation of the remote controller 200, which is received through the wireless communication unit 411.

A transfer signal of the remote controller 200, which is input into the display device 100 through the user input interface 150 is transferred to the controller 170 of the display device 100. The controller 170 determines information on the operation of the remote controller 200 and information on operating of a key, from the signal transferred by the remote controller 200, and correspondingly controls the display device 100.

As another example, the remote controller 200 calculates a coordinate value of a pointer, which corresponds to the operation of the remote controller 200, and outputs the calculated value to the user input interface 150 of the display device 100. In this case, the user input interface 150 of the display device 100 transfers information on the received coordinate values of the pointer, to the controller 170, without performing a process of compensating for the hand movement and the error.

In addition, as another example, unlike in the drawings, it is also possible that the coordinate value calculator 415 is included within the controller 170 instead of the user input interface 150.

Figure 5:
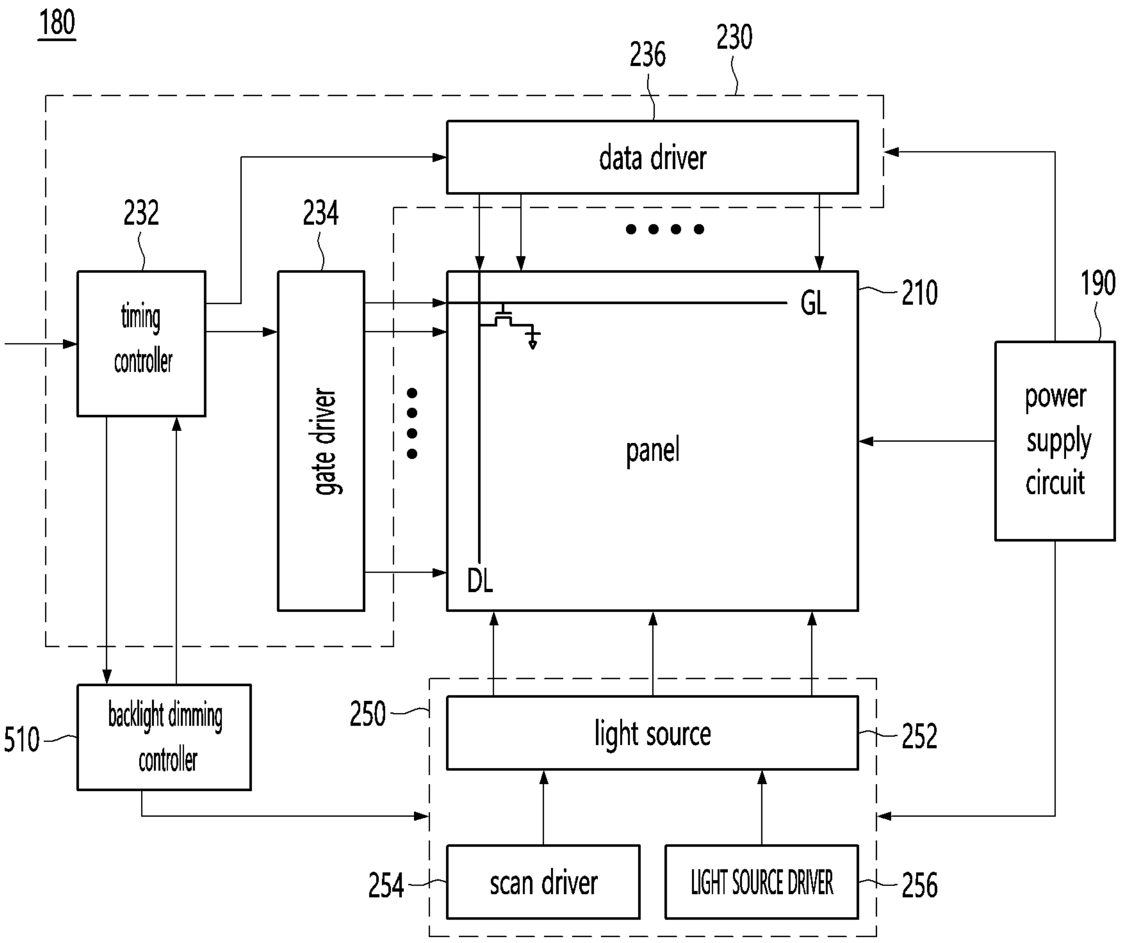
FIG. 5 is an internal block diagram of the power supply circuit and the display of FIG. 2.

FIG. 5 is a block diagram illustrating an inner part of the power supply and the display of FIG. 2.

Referring to drawings, the display module 180 based on a liquid crystal panel (LCD) panel may include a liquid crystal display panel 210, a driving circuit 230, a backlight unit 250, a backlight dimming controller 510.

The liquid crystal panel 210 has a plurality of gate lines GL and data lines DL crossing each other in a matrix form, and includes a first substrate, in which a thin film transistor and a pixel electrode connected to the thin film transistor are formed at the crossing area, a second substrate including a common electrode, and a liquid crystal layer interposed between the first substrate and the second substrate.

The driving circuit 230 drives the liquid crystal display panel 210 based on a control signal and a data signal supplied from the controller 170 of FIG. 1. To this end, the driving circuit 230 includes a timing controller 232, a gate driver 234, and a data driver 236.

The timing controller 232 receives the control signal and an R, G, and B signals, and a vertical synchronization (Vsync) signal from the controller 170 to control the gate driver 234 and the data driver 236, in response to the control signal, re-arranges the R, G, and B data signals, and provides the R, G, and B signals to the data driver 236.

A scan signal and an image signal are supplied to the liquid crystal display panel 210 through the gate line GL and the data line DL, in response to the control of the gate driver 234, the data driver 236, and the timing controller 232.

The backlight unit 250 supplies light to the liquid crystal display panel 210. To this end, the backlight unit 250 may include a plurality of light sources 252, a scan driver 254, which controls the scanning driving of the light source 252, and a light source driver 256 which turns On/Off the light source 252.

A specific image is displayed by using light output from the backlight unit 250, in the state that the light transmittance of the liquid crystal layer is adjusted by an electric generated formed between a pixel electrode and a common electrode of the liquid crystal display panel 210.

The power supply circuit 190 may supply a common electrode voltage Vcom to the liquid crystal panel 210, and may supply a gamma voltage to the data driver 236. In addition, driving power may be supplied to the backlight unit 250 to drive the light source 252.

Meanwhile, the backlight unit 250 is divided into a plurality of blocks for driving. The controller 170 may control the display 180 to perform local dimming by setting a dimming value for each of the plurality of blocks. In detail, the timing controller 232 may output input image data RGB to the backlight dimming controller 510, and the backlight dimming controller 510 may calculate the dimming value of each of the plurality of blocks, based on the input image data RGB received from the timing controller 232.

Figure 6:
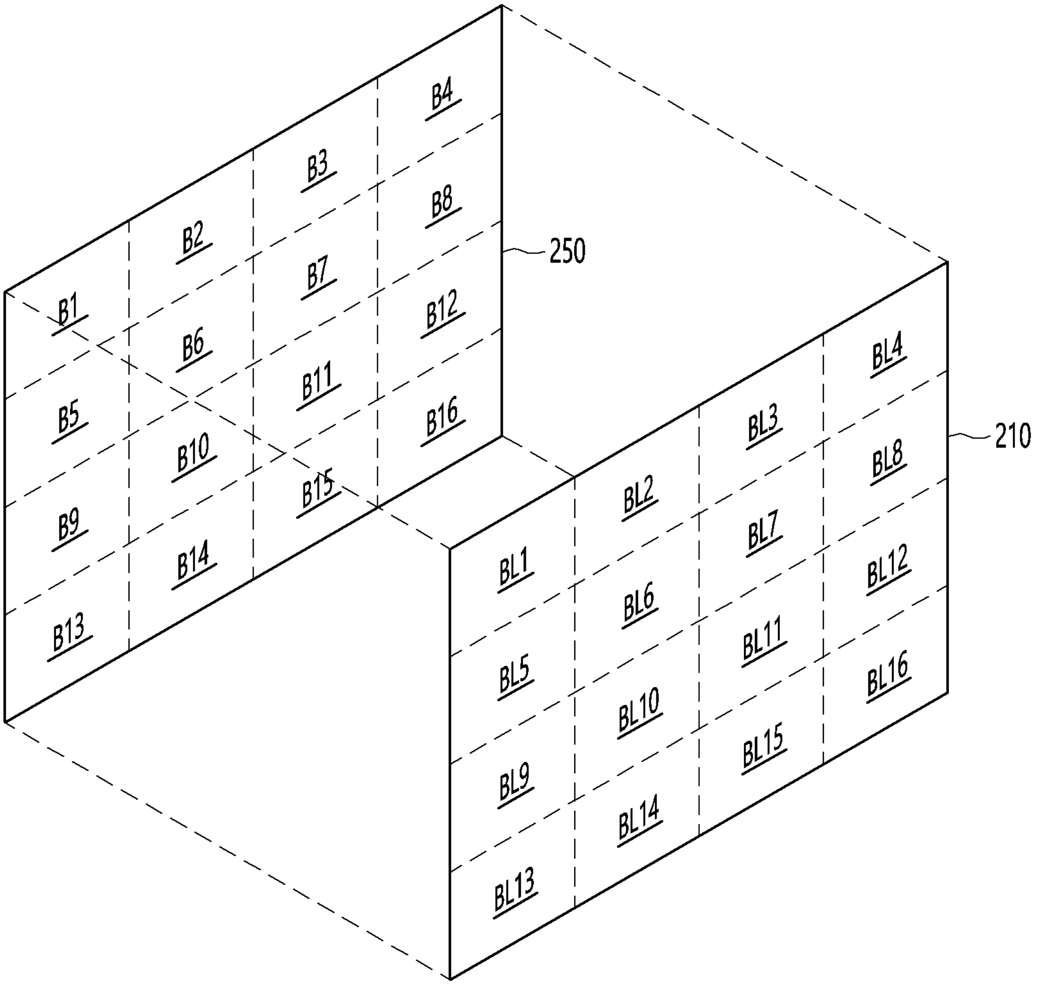
FIG. 6 is an exemplary view illustrating an arrangement of a liquid crystal display panel and light sources in the case of a direct type backlight unit.

FIG. 6 is an exemplary view illustrating an arrangement of a liquid crystal display panel and light sources in the case of a direct type backlight unit.

A liquid crystal display panel 210 may be divided into a plurality of virtual blocks as shown in FIG. 6. Although it is illustrated in FIG. 6 that the liquid crystal display panel 210 is equally divided into 16 blocks BL1 to BL16 as an example, it is noted that the present disclosure is not limited thereto.

Each of the plurality of blocks may include a plurality of pixels.

The backlight unit 250 may be implemented as either an edge type or a direct type.

When the backlight unit 250 is implemented with a direct type backlight unit, the backlight unit 250 may be divided to correspond to the blocks BL1 to BL16 of the liquid crystal display panel 210 on a one to one basis as shown in FIG. 6. In this case, the brightness of light incident on the first block BL1 of the liquid crystal display panel 210 may be adjusted using light sources 252 included in the first block B1 of the backlight unit 250 disposed at a position corresponding to the first block BL1 of the liquid crystal display panel 210.

The light sources 252 may be implemented as point light sources such as light emitting diodes (LEDs). The light sources 252 are turned on and off by receiving light source driving signals LDS from light source driver 256. The intensity of light of the light sources 252 may be adjusted according to an amplitude of the light source driving signals LDS, and the lighting period of the light sources 252 may be adjusted according to a pulse width. The brightness of the light output from the light sources 252 may be adjusted according to the light source driving signal LDS.

The light source driver 256 may generate light source driving signals LDS based on dimming values of the blocks input from a backlight dimming control unit 510 and output the light source driving signals LDS to the light source 252. The dimming values of the blocks may be values for implementing local dimming, and may correspond to the brightness of light output from the light sources 252.

Meanwhile, recently, in order to increase a brightness of light and control the light more precisely, the display device 100 may include a backlight unit 250 including mini LEDs.

The mini LED may be an LED that is less than 1/10 the size of a conventional light source. For example, the size of the mini LED may be in a range of 100 to 200 μm, but this is not limited thereto as it is only an example. The size and number of mini-LEDs disposed on the backlight unit 250 may vary according to the size of the display 180.

The display device 100 including the backlight unit 250 in which thousands to tens of thousands of mini LEDs are disposed may include a plurality of driving devices to implement a local dimming function. The driving device may be an LED control integrated circuit (IC).

Specifically, the backlight unit 250 may include a plurality of light source arrays, each of the plurality of light source arrays may include a plurality of blocks, and each of the plurality of blocks may include a plurality of light sources. For example, about 9 to 16 light sources may be included in one block, but this is only an example.

In addition, the plurality of blocks may be divided into a plurality of groups. Specifically, blocks included in one light source array are controlled by a plurality of driving devices, and blocks to be respectively controlled by the plurality of driving devices may be divided into groups. That is, the blocks included in one light source array may be divided into a first group of blocks to be controlled by the first driving device, a second group of blocks to be controlled by the second driving device, . . . , an N-th group of blocks to be controlled by the N-th driving device.

That is, the light source driver 256 may include a plurality of driving devices respectively corresponding to the plurality of groups.

Meanwhile, in the related art, blocks are sequentially arranged from top to bottom for each group. Details will be described with reference to FIG. 7.

Figure 7:
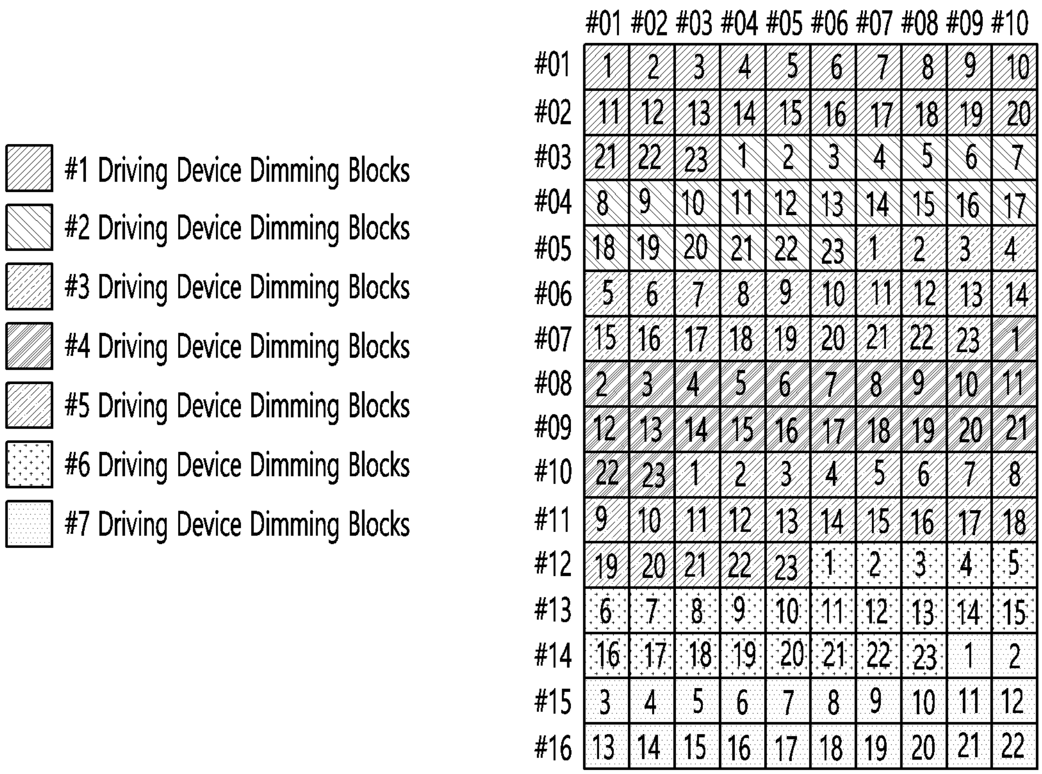
FIG. 7 is an exemplary view illustrating the arrangement of light source blocks disposed in a conventional light source array.

FIG. 7 is an exemplary view illustrating the arrangement of light source blocks disposed in a conventional light source array.

In the conventional light source array 1000, blocks are arranged in a horizontal direction so as to be interlocked with a scan line. Referring to the specific example shown in FIG. 7, the blocks of the first group are arranged in (row 1, column 1) to (row 3, column 3), the blocks of the second group are arranged in (row 3, column 4) to (row 5, column 6), the blocks of the third group are arranged in (row 5, column 7) to (row 7, column 9), the blocks of the fourth group are arranged in (row 7, column 10) to (row 10, column 2), the blocks of the fifth group are arranged in (row 10, column 3) to (row 12, column 5), the blocks of the sixth group are arranged in (row 12, column 6) to (row 14, column 8), and the blocks of the seventh group are arranged in (row 14, column 9) to (row 14, column 16). That is, the conventional light source array 1000 may be designed such that blocks are arranged in the sequence of rows.

As described above, the conventional light source array 1000 is designed such that blocks belonging to the same group are sequentially arranged in the horizontal direction, and accordingly, about two rows are controlled by the same driving device. However, due to the characteristics of the image, blocks in the horizontal direction tends to be controlled to have the same or similar brightness in many cases. Due to the characteristics, a case may occur in which some driving devices are consecutively loaded and other driving devices are consecutively unloaded. For example, in a case where the light source array 1000 is arranged as shown in FIG. 7, when white is output in the first and second rows and black is output in the remaining rows, the first driving device is in a loaded state, and the remaining second to seventh driving devices are in a unloaded state. Accordingly, there is a problem in that heat is generated only in the first driving device, thereby causing a hot spot.

Accordingly, an object of the present disclosure is to provide a backlight unit capable of distributing a load applied to driving devices. According to an embodiment of the present disclosure, blocks belonging to the same group in a light source array may be consecutively arranged in s vertical direction.

Figure 8:
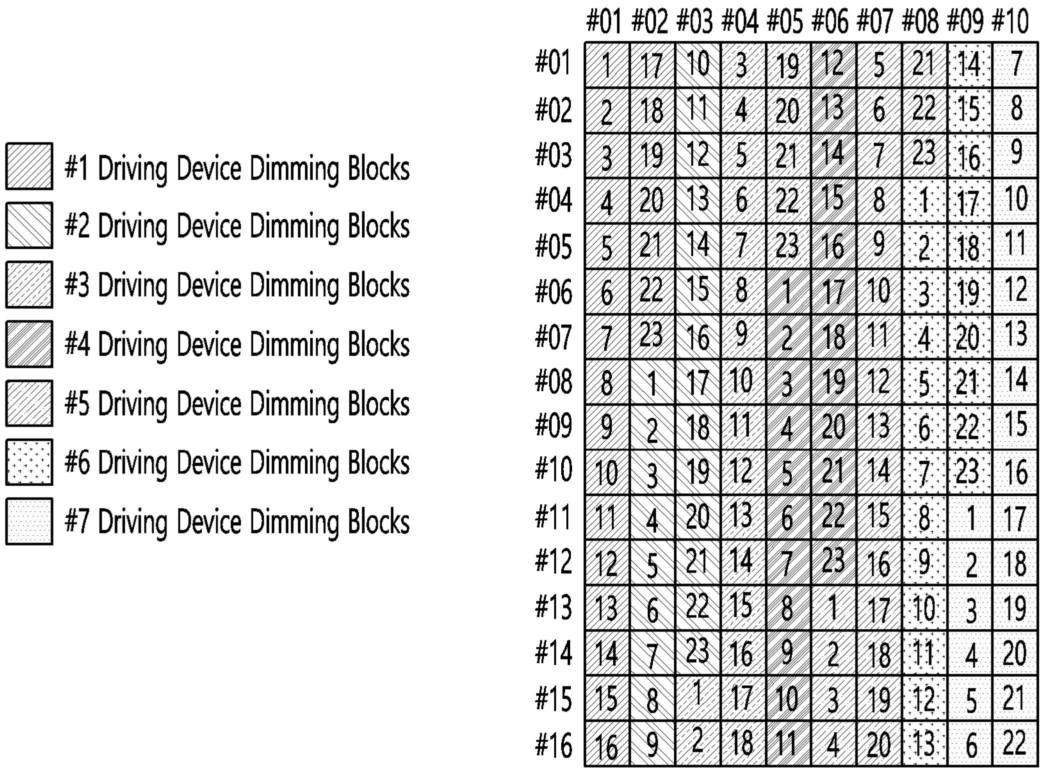
FIG. 8 is an exemplary diagram illustrating an arrangement of light source blocks disposed in a light source array according to a first embodiment of the present disclosure.

FIG. 8 is an exemplary diagram illustrating an arrangement of light source blocks disposed in a light source array according to a first embodiment of the present disclosure.

Referring to FIG. 8, blocks belonging to the same group may be sequentially disposed in a light source array 1010 in the vertical direction. Referring to the specific example shown in FIG. 8, the blocks of the first group are arranged in (column 1, row 1) to (column 2, row 7), the blocks of the second group are arranged in (column 2, row 8) to (column 3, row 14), the blocks of the third group are arranged in (column 3, row 15) to (column 5, row 5), the blocks of the fourth group are arranged in (column 5, row 6) to (column 6, row 12), the blocks of the fifth group are arranged in (column 6, row 13) to (column 8, row 3), the blocks of the sixth group are arranged in (column 8, row 4) to (column 9, row 10), and the blocks of the seventh group are arranged in (column 9, row 11) to (column 11, row 16). That is, the light source array 1010 according to the first embodiment of the present disclosure may be designed such that blocks are arranged in in the sequence of columns.

Accordingly, when white is output in the first and second rows and black is output in the remaining rows, a load may be evenly distributed among the first to seventh driving devices. That is, when the blocks are arranged in the vertical direction, it is possible to minimize a problem of the load being biased on some driving devices and heat generated in the driving device is dispersed, resulting in minimization in the overall heat generation of a product.

Meanwhile, even in the case of the light source array 1010 illustrated in FIG. 8, an image in which only the first and second columns are driven may be output, and accordingly, heat is generated in only the first driving device, thereby causing a hot spot. In addition, since the first blocks of driving devices are located at different positions (different rows and different columns), there is a disadvantage in that the driving sequence becomes complicated.

Accordingly, a method capable of resolving the above-described problems and disadvantages will be described with reference to FIG. 9.

Figure 9:
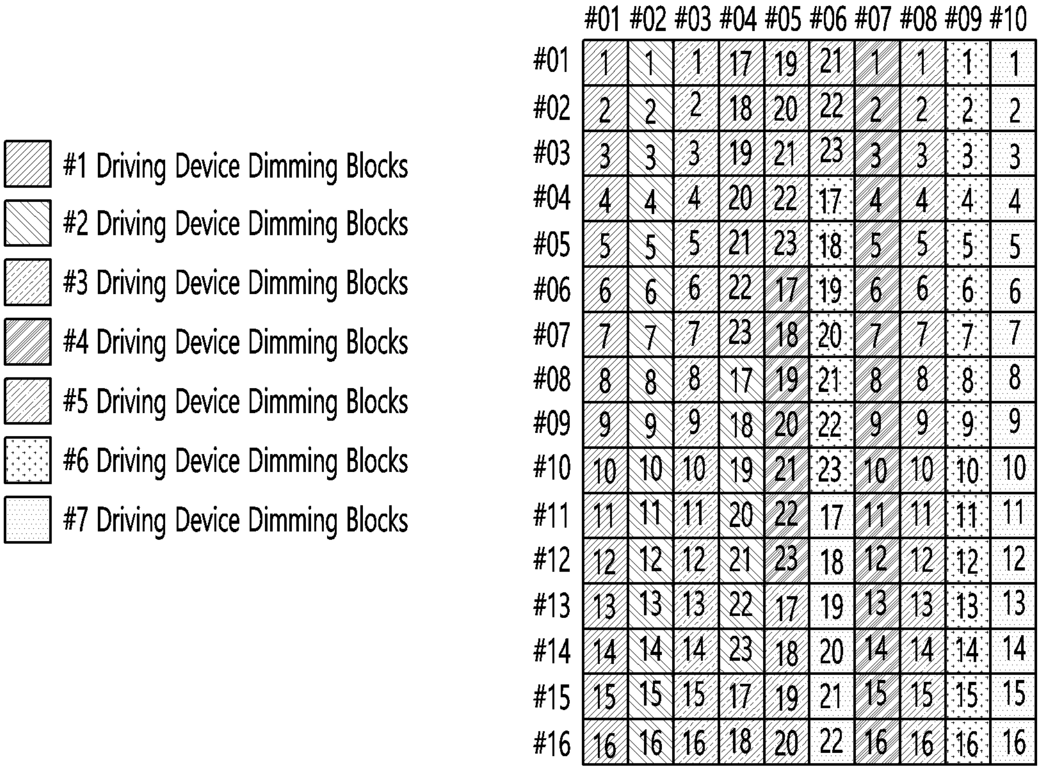
FIG. 9 is an exemplary diagram illustrating an arrangement of light source blocks disposed in a light source array according to a second embodiment of the present disclosure.

FIG. 9 is an exemplary diagram illustrating an arrangement of light source blocks disposed in a light source array according to a second embodiment of the present disclosure.

Referring to FIG. 9, blocks belonging to the same group may be sequentially disposed in a light source array 1020 in the vertical direction.

In particular, a design is made such that some of blocks belonging to one group to cross blocks of another group, thus causing blocks belonging to the same group to be dispersed.

Specifically, referring to the specific example shown in FIG. 9, the blocks of the first group are arranged in all rows of column 1 and rows 1 to 7 of column 4, the blocks of the second group are arranged in all rows of column 2 and rows 8 to 14 of column 4, the blocks of the third group are arranged in all rows of column 3 and column 15 to 16 of column 4, the blocks of the fourth group are arranged in all rows of column 7 and rows 6 to 12 of column 5, the blocks of the fifth group are arranged in all rows of column 8 and rows 13 to 16 of column 5, the blocks of the sixth group are arranged in all rows of column 9 and rows 4 to 10 of column 6, and the blocks of the seven group are arranged in all rows of column 1 and rows 11 to 16 of column 6. That is, in the light source array 1020 according to the second embodiment of the present disclosure, some of the blocks belonging to each group may be disposed in in all rows of at least one column, and the rest blocks may be disposed in another column. Also, a column to which blocks occupying all rows of one column may be designed to be spaced apart from a column in which the remaining blocks are arranged.

That is, blocks belonging to the same group may be arranged non-consecutively in the horizontal direction. According to an embodiment, all blocks belonging to the same group may be arranged to be spaced apart from each other in the horizontal direction. Accordingly, there is no blocks of the same group disposed right next to each other.

According to another embodiment, blocks belonging to the same group may be arranged non-consecutively in the horizontal direction to be spaced by a predetermined number or more. For example, the predetermined number may be three, and is only an example, so that it is appropriate that the number is not limited thereto. Through this, blocks of the same group consecutively arranged in the horizontal direction may be minimized.

Accordingly, it is possible to minimize the problem that the load is biased only on a specific driving device, such as when outputting an image requiring only the first and second columns to be driven, thus dispersing the heat from the driving device and therefore lowering the overall heat of a product.

In addition, according to the embodiment shown in FIG. 9, since the first blocks of groups to be controlled by each driving device are all located in first rows, the driving order is uniformly designed, and thus the ease of design and control is secured.

Figure 10:
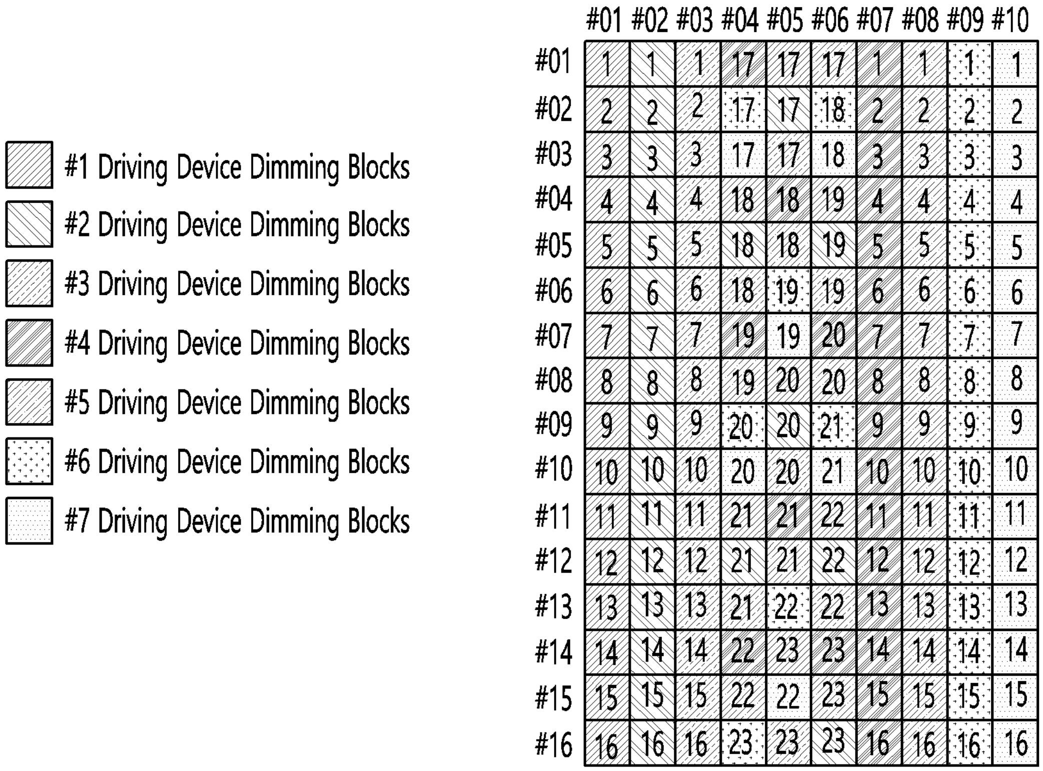
FIG. 10 is an exemplary diagram illustrating an arrangement of light source blocks disposed in a light source array according to a third embodiment of the present disclosure.

FIG. 10 is an exemplary diagram illustrating an arrangement of light source blocks disposed in a light source array according to a third embodiment of the present disclosure.

Referring to FIG. 10, blocks belonging to the same group may be sequentially disposed in a light source array 1030 in the vertical direction.

In particular, blocks corresponding to one group may be disposed in some of columns constituting a light source array, and blocks corresponding to several groups may be disposed non-consecutively in other columns.

Specifically, referring to the specific example shown in FIG. 10, a first group of blocks are arranged in all rows of the first column, a second group of blocks are arranged in the arranged in all rows of the second column, a third group of blocks are arranged in the arranged in all rows of the third column, a fourth group of blocks are arranged in the arranged in all rows of the seventh column, a fifth group of blocks are arranged in the arranged in all rows of the eighth column, a sixth group of blocks are arranged in the arranged in all rows of the ninth column, a seventh group of blocks are arranged in the arranged in all rows of the tenth column, and blocks corresponding to different groups are arranged non-consecutively in the horizontal or vertical direction.

Of course, in FIG. 10, the columns in which blocks belonging to the same group arranged are illustrated as first to third and seventh to tenth columns, but this is only an example, and thus it is appropriate that the present disclosure is not limited thereto.

In this case, as described in FIG. 9, it is possible to minimize the problem that the load is biased only on a specific driving device, such as when outputting an image requiring only the first and second columns to be driven, thus dispersing the heat from the driving device and therefore lowering the overall heat of a product.

In addition, since the first blocks of groups to be controlled by each driving device are all located in first rows, the driving order is uniformly designed, and thus the ease of design and control is secured.

Figure 11:
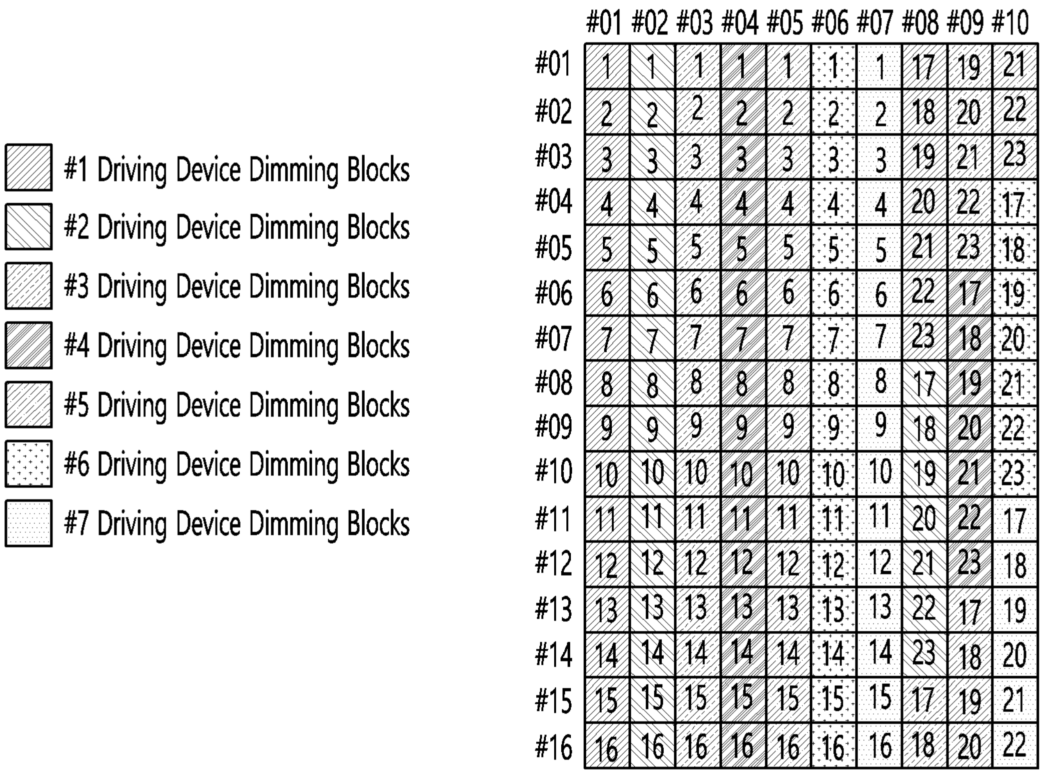
FIG. 11 is an exemplary diagram illustrating an arrangement of light source blocks disposed in a light source array according to a fourth embodiment of the present disclosure.

FIG. 11 is an exemplary diagram illustrating an arrangement of light source blocks disposed in a light source array according to a fourth embodiment of the present disclosure.

Referring to FIG. 11, blocks belonging to the same group may be sequentially disposed in a light source array 1040 in the vertical direction.

In particular, blocks corresponding to one group may be disposed in some of columns constituting a light source array, and remaining blocks may be disposed consecutively in the vertical direction in other columns.

Specifically, referring to the specific example shown in FIG. 11, a first group of blocks are arranged in all rows of the first column, a second group of blocks are arranged in the arranged in all rows of the second column, a third group of blocks are arranged in the arranged in all rows of the third column, a fourth group of blocks are arranged in the arranged in all rows of the fourth column, a fifth group of blocks are arranged in the arranged in all rows of the fifth column, a sixth group of blocks are arranged in the arranged in all rows of the sixth column, a seventh group of blocks are arranged in the arranged in all rows of the seventh column, and remaining blocks of the groups, which are not arranged in the first to seventh columns, are arranged consecutively in the vertical direction.

Of course, in FIG. 11, the columns in which blocks belonging to the same group arranged are illustrated as first to seventh columns, but this is only an example, and thus it is appropriate that the present disclosure is not limited thereto.

In this case, as described in FIG. 9, it is possible to minimize the problem that the load is biased only on a specific driving device, such as when outputting an image requiring only the first and second columns to be driven, thus dispersing the heat from the driving device and therefore lowering the overall heat of a product.

In addition, since the first blocks of groups to be controlled by each driving device are all located in first rows, the driving order is uniformly designed, and thus the ease of design and control is secured.

In addition, since the remaining blocks not arranged in the first to seventh columns are consecutively arranged in the vertical direction for each group, there is an advantage in that the ease of design and control is secured due to a relatively uniform design.

Figure 12:
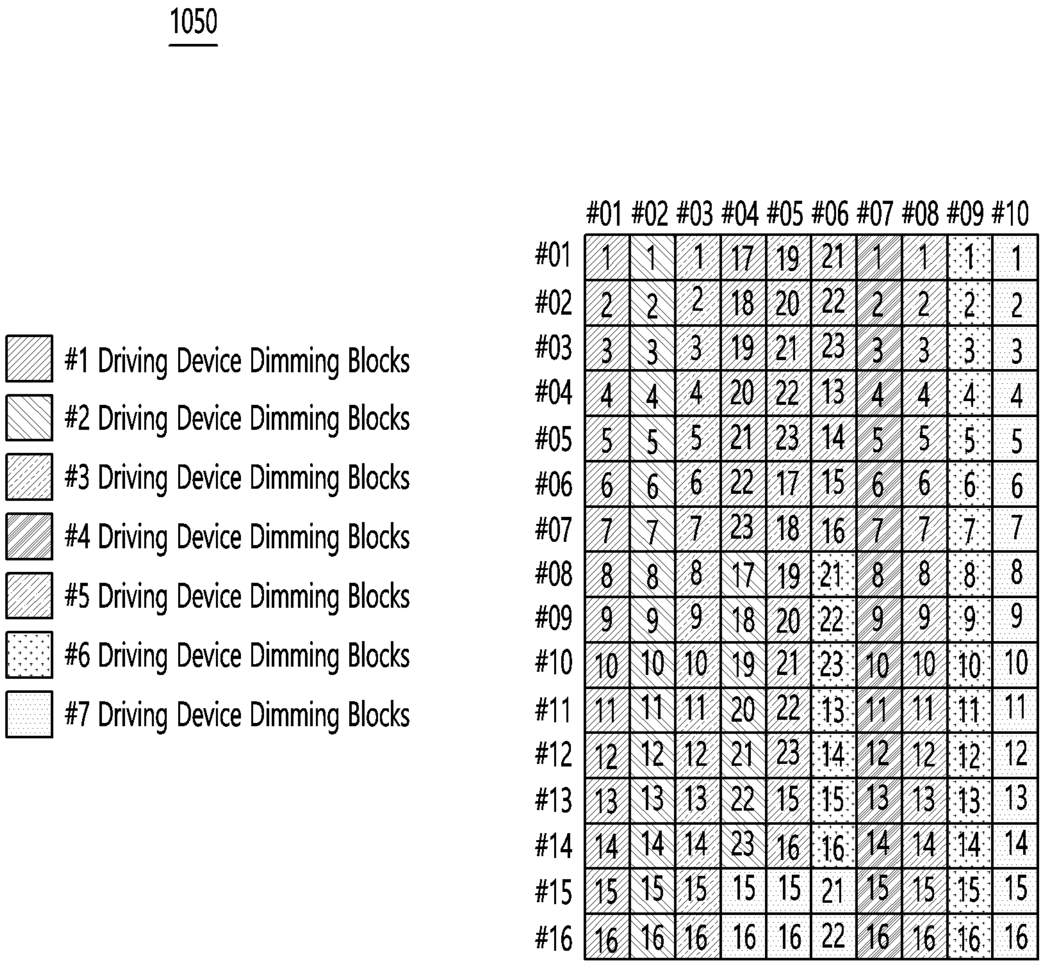
FIG. 12 is an exemplary diagram illustrating an arrangement of light source blocks disposed in a light source array according to a fifth exemplary embodiment of the present disclosure.

FIG. 12 is an exemplary diagram illustrating an arrangement of light source blocks disposed in a light source array according to a fifth exemplary embodiment of the present disclosure.

Referring to FIG. 12, blocks belonging to the same group may be consecutively disposed in a light source array 1050 in the vertical direction.

In particular, blocks corresponding to one group may be disposed in some of columns constituting a light source array, and remaining blocks may be disposed consecutively in the vertical direction in other columns.

Specifically, referring to the specific example shown in FIG. 12, a first group of blocks are arranged in all rows of the first column, a second group of blocks are arranged in the arranged in all rows of the second column, a third group of blocks are arranged in the arranged in all rows of the third column, a fourth group of blocks are arranged in the arranged in all rows of the seventh column, a fifth group of blocks are arranged in the arranged in all rows of the eighth column, a sixth group of blocks are arranged in the arranged in all rows of the ninth column, a seventh group of blocks are arranged in the arranged in all rows of the tenth column, and remaining blocks of the groups, which are not arranged in the first to third columns and the seventh to tenth columns, are arranged consecutively in the vertical direction.

Compared with the embodiment shown in FIG. 11, there is a difference in whether a column in which two or more groups of blocks are arranged is located at the side or the center of the light source array.

Of course, in FIG. 12, the columns in which blocks belonging to the same group arranged are illustrated as first to third and seventh to tenth columns, but this is only an example, and thus it is appropriate that the present disclosure is not limited thereto.

In this case, as described in FIG. 9, it is possible to minimize the problem that the load is biased only on a specific driving device, such as when outputting an image requiring only the first and second columns to be driven, thus dispersing the heat from the driving device and therefore lowering the overall heat of a product.

In addition, since the first blocks of groups to be controlled by each driving device are all located in first rows, the driving order is uniformly designed, and thus the ease of design and control is secured.

In addition, since the remaining blocks not arranged in the first to seventh columns are consecutively arranged in the vertical direction for each group, there is an advantage in that the ease of design and control is secured due to a relatively uniform design.

Meanwhile, the above-described first to fifth embodiments are merely some embodiments of the present disclosure. That is, the present disclosure may include various arrangements of blocks in addition to the examples shown in FIGS. 8 to 12.

The present disclosure may include all of light source arrays in which blocks belonging to the same group are arranged such that a number of consecutive blocks in the horizontal direction is less than a number of consecutive blocks in the vertical direction. In other words, the present disclosure may include all of light source arrays in which blocks belonging to the same group are arranged such that a number of consecutive blocks in the vertical direction is greater than a number of consecutive blocks in the horizontal direction.

As in the present disclosure, when the blocks of a light source array are arranged in the vertical direction, a problem of the load being biased on some driving devices is minimized, and heat generated in the driving device is dispersed, resulting in minimization in the overall heat generation of a product.

In addition, when the blocks of the light source array are arranged in the vertical direction, there is an advantage in that when the blocks of the light source array are arranged in the horizontal direction, the driving device and a plurality of blocks are present in the entire horizontal direction, thereby minimizing the problem of interfering with the pattern connections for other driving device. That is, as the blocks of the light source array are arranged in the vertical direction, there is an advantage in that the PCB pattern design between the driving device and the plurality of blocks becomes easier than when the blocks of the light source array are arranged in the horizontal direction.

In addition, when the blocks of the light source array are arranged in the vertical direction, the blocks are orthogonal to the scanning direction, thus preventing an inrush current.

Meanwhile, such a light source array may be mounted on a light source circuit board. Specifically, a light source array may be mounted on one surface of the light source circuit board, and a plurality of driving devices for controlling blocks included in the light source array on a group basis may be mounted on the other surface of the light source circuit board.

However, the conventional driving device has been often mounted immediately behind blocks that are to be controlled by each driving device. Accordingly, there is a problem in that the heat generated by the light source overlaps the heat generated by the driving device, thereby increasing stress in the corresponding region. Accordingly, the present disclosure seeks to minimize the problem of overlapping of heat generated by the light source and heat generated by the driving device by disposing the driving device irrespective of the driving region in which blocks to be controlled by each driving device are disposed.

Figure 13:
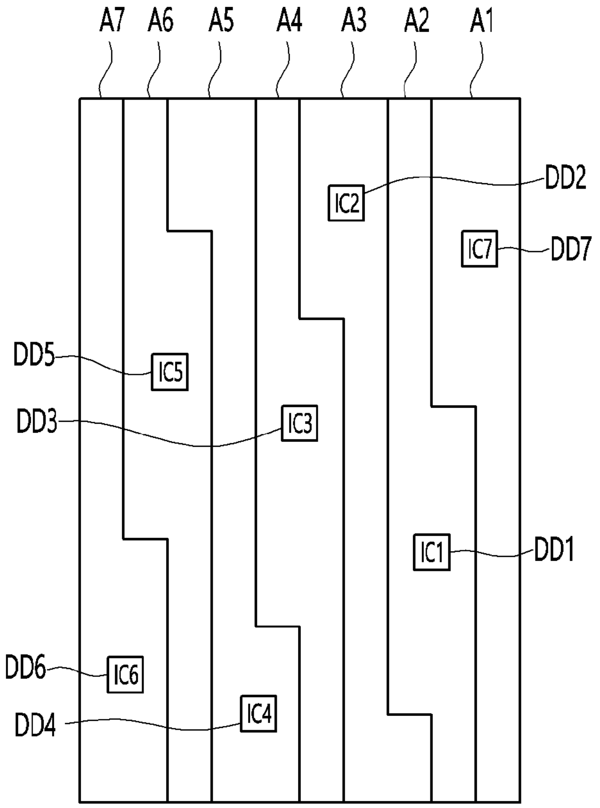
FIG. 13 is an exemplary view for describing an arrangement of a plurality of driving devices according to the first embodiment of the present disclosure.

FIG. 13 is an exemplary view for describing an arrangement of a plurality of driving devices according to the first embodiment of the present disclosure.

FIG. 13A is a view showing a light source array disposed on one surface of a light source circuit board, and FIG. 13B is a view showing the back side of the light source circuit board on which the light source array is disposed as shown in FIG. 13A.

In FIG. 13B, a first driving area A1 may be an area in which a first group of blocks are disposed, a second driving area A2 may be an area in which a second group of blocks are disposed, a third driving area A3 may be an area in which a third group of blocks are disposed, a fourth driving area A4 may be an area in which a fourth group of blocks are disposed, a fifth driving area A5 may be an area in which a fifth group of blocks are disposed, a sixth driving area A6 may be an area in which a sixth group of blocks are disposed, and a seventh driving area A7 may be an area in which a seventh group of blocks are disposed. The driving areas A1 to A7 may be control areas of the driving devices DD1 to DD7 respectively controlling blocks of the corresponding areas.

Further, in FIG. 13B, IC1 may be a first driving device DD1 that controls the first group of blocks, IC2 may be a second driving device DD2 that controls the second group of blocks, IC3 may be a third driving device DD3 that controls the third group of blocks, IC4 may be a fourth driving device DD4 that controls the fourth group of blocks, IC5 may be a fifth driving device DD5 that controls the fifth group of blocks, IC6 may be a sixth driving device DD6 that controls the sixth group of blocks, and IC7 may be a seventh driving device DD7 that controls the seventh group of blocks.

Referring to the specific example shown in FIG. 13, the first driving device DD1 may be disposed in the second driving area A2, the second driving device DD2 may be disposed in the third driving area A3, the third driving device DD3 may be disposed in the fourth driving area A4, the fourth driving device DD4 may be disposed in the fifth driving area A5, the fifth driving device DD5 may be disposed in the sixth driving area A6, the sixth driving device DD6 may be disposed in the seventh driving area A7, and the seventh driving device DD7 may be disposed in the first driving area A1.

That is, each of the plurality of driving devices DD1 to DD7 may be disposed so as not to overlap blocks of a corresponding group.

On the other hand, when the driving devices DD1 to DD7 are randomly arranged, the PCB artwork is complicated, and processing of a relevant machine is difficult.

Accordingly, the present disclosure arranges the plurality of driving devices DD1 to DD7 in a line, thus simplifying the structure of the mechanism and enabling ease of assembly and simplification of the shape of a corresponding mechanism to be assembled.

Figure 14:
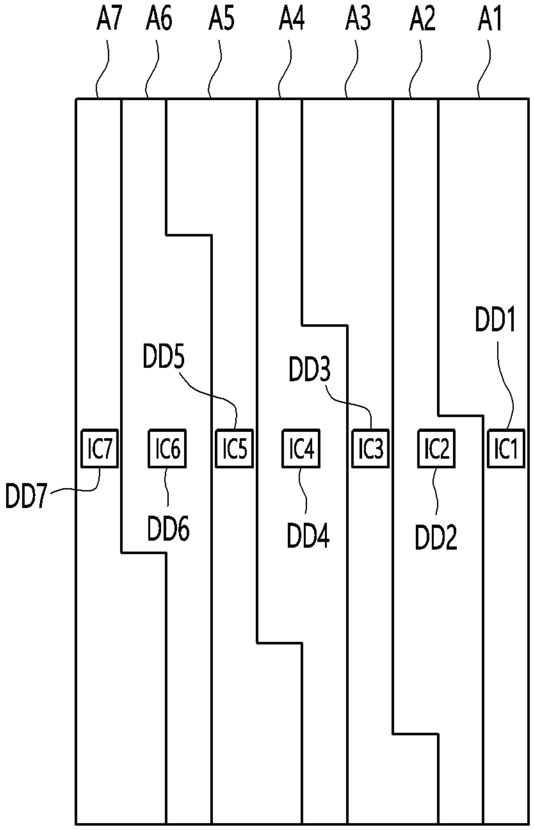
FIG. 14 is an exemplary view for describing an arrangement of a plurality of driving devices according to a second embodiment of the present disclosure.

FIG. 14 is an exemplary view for describing an arrangement of a plurality of driving devices according to a second embodiment of the present disclosure.

FIG. 14A is a view showing a light source array disposed on one surface of a light source circuit board, and FIG. 14B is a view showing the back side of the light source circuit board on which the light source array is disposed as shown in FIG. 14A.

A1 to A7 and IC1 to IC7 are the same as described with reference to FIG. 13, and thus overlapping descriptions will be omitted.

Referring to FIG. 14, a plurality of driving devices DD1 to DD7 may be arranged in a line. In particular, the plurality of driving devices DD1 to DD7 may be arranged in a line in a horizontal direction. In addition, the plurality of driving devices DD1 to DD7 may be arranged to belong to only one driving area. That is, the plurality of driving devices DD1 to DD7 may not be disposed across two or more driving areas.

Figure 15:
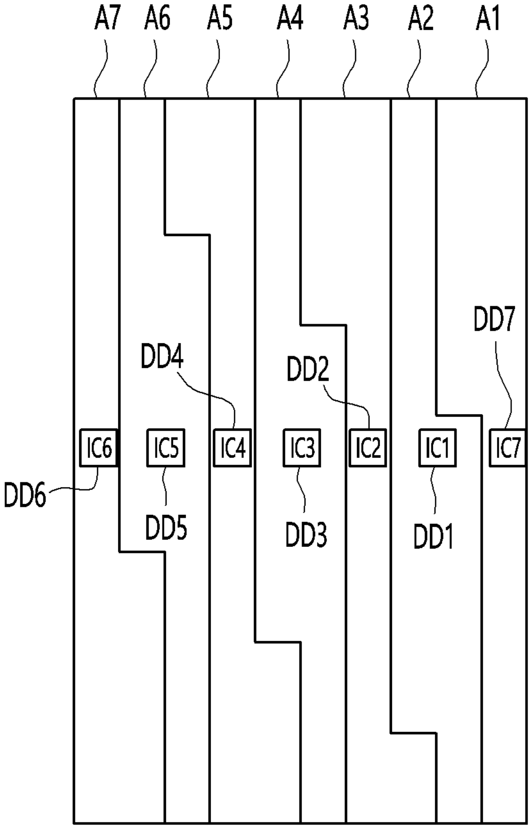
FIG. 15 is an exemplary view for describing an arrangement of a plurality of driving devices according to a third embodiment of the present disclosure.

FIG. 15 is an exemplary view for describing an arrangement of a plurality of driving devices according to a third embodiment of the present disclosure.

FIG. 15A is a view showing a light source array disposed on one surface of a light source circuit board, and FIG. 15B is a view showing the back side of the light source circuit board on which the light source array is disposed as shown in FIG. 15A.

A1 to A7 and IC1 to IC7 are the same as described with reference to FIG. 13, and thus overlapping descriptions will be omitted.

According to the embodiment shown in FIG. 15, the plurality of driving devices DD1 to DD7 may be arranged in a line while not overlapping blocks of a corresponding group. That is, each of the plurality of driving devices DD1 to DD7 may be disposed in a line while not overlapping blocks of a corresponding group.

In this case, it is possible to minimize the problem of overlapping of the heat generated by the light source and the heat generated by the driving device and at the same time, solve the problem in which the PCB artwork is complicated and processing of a relevant machine is difficult.

Figure 16:
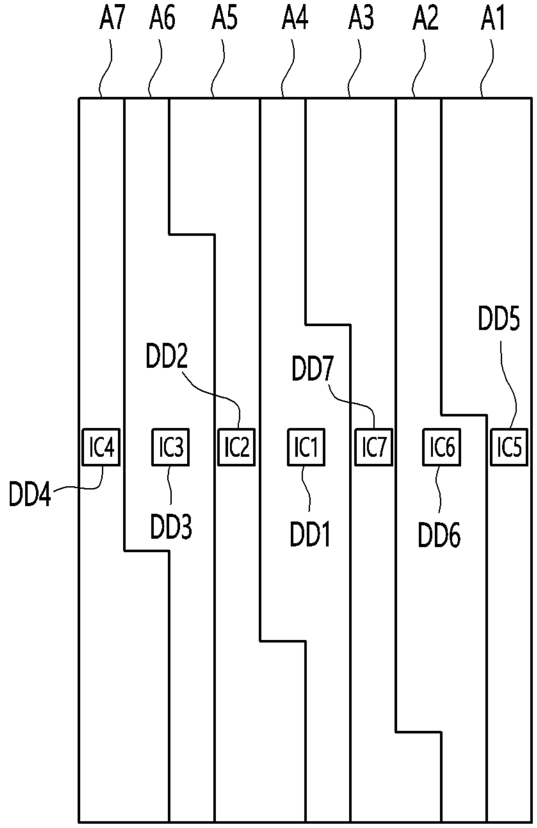
FIG. 16 is an exemplary view for describing an arrangement of a plurality of driving devices according to a fourth embodiment of the present disclosure.

FIG. 16 is an exemplary view for describing an arrangement of a plurality of driving devices according to a fourth embodiment of the present disclosure.

FIG. 16A is a view showing a light source array disposed on one surface of a light source circuit board, and FIG. 16B is a view showing the back side of the light source circuit board on which the light source array is disposed as shown in FIG. 16A.

A1 to A7 and IC1 to IC7 are the same as described with reference to FIG. 13, and thus overlapping descriptions will be omitted.

According to the embodiment shown in FIG. 15, the plurality of driving devices DD1 to DD7 may be arranged in a line at positions which are maximally spaced apart from and do not overlap blocks of a corresponding group.

Referring to the specific example shown in FIG. 16, the first driving device DD1 may be disposed in the fourth driving area A4, the second driving device DD2 may be disposed in the fifth driving area A5, the third driving device DD3 may be disposed in the sixth driving area A6, the fourth driving device DD4 may be disposed in the seventh driving area A7, the fifth driving device DD5 may be disposed in the first driving area A1, the sixth driving device DD6 may be disposed in the second driving area A2, and the seventh driving device DD7 may be disposed in the third driving area A3.

Accordingly, the sum of the separation distance between the first driving device DD1 and the first driving area A1, the separation distance between the second driving device DD2 and the second driving area A2, the separation distance between the third driving device DD3 and the third driving area A3, the separation distance between the fourth driving device DD4 and the fourth driving area A4, the separation distance between the fifth driving device DD5 and the fifth driving area A5, the separation distance between the sixth driving device DD6 and the sixth driving area A6, and the separation distance between the seventh driving device DD1 and the seventh driving area A7 may be the maximum.

Accordingly, it is possible to effectively resolve the problem of overlapping of heat generated from the light source and heat generated from the driving device.

Meanwhile, a signal transfer connector for transmitting and receiving signals for controlling a plurality of blocks may be further formed on the above-described light source circuit board. A signal transfer connector for reception and a signal transfer connector for transmission may be formed on one light source circuit board. when the two signal transfer connectors are formed in the same direction, the space required for connector assembly increases and the signal quality is deteriorated.

Figure 17:
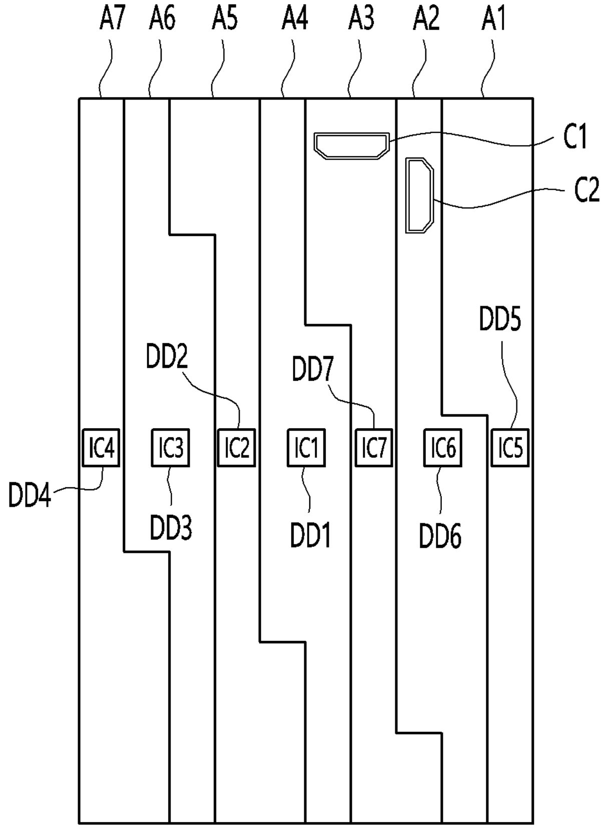
FIG. 17 is an exemplary view for describing an arrangement of a signal transmission connector according to an embodiment of the present disclosure.

FIG. 17 is an exemplary view for describing an arrangement of a signal transmission connector according to an embodiment of the present disclosure.

FIG. 17 shows a surface on which a plurality of driving devices is disposed on the light source circuit board.

The signal transfer connectors C1 and C2 may be formed together on the surface on which the plurality of driving devices DD1 to DD7 are disposed. The first signal transfer connector C1 and the second signal transfer connector C2 may be disposed in different directions. For example, the first signal transfer connector C1 may be arranged in a direction in which cables are connected thereto in a vertical direction, and the second signal transfer connector C2 may be arranged in a direction in which cables are connected thereto in a horizontal direction. On the contrary, the first signal transfer connector C1 may be arranged in a direction in which cables are connected thereto in the horizontal direction, and the second signal transfer connector C2 may be arranged in a direction in which cables are connected thereto in the vertical direction. In summary, a plurality of signal transfer connectors is formed on the light source circuit board, and the plurality of signal transfer connectors may be arranged in different directions.

In addition, the first signal transfer connector C1 and the second signal transfer connector C2 may be disposed so as to minimize the distance between the first signal transfer connector C1 and the second signal transfer connector C2.

Accordingly, there is an advantage in that the convenience of PCB artwork is improved and deterioration in signal quality is prevented.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

What is claimed is:

1. A display device comprising:

a liquid crystal display panel; and a backlight unit configured to supply light to the liquid crystal display panel;

wherein the backlight unit includes:

a light source array including a plurality of blocks each including a plurality of light sources, and a light source driver configured to control the plurality of blocks, wherein the plurality of blocks are divided into a plurality of groups, and wherein blocks belonging to a same group are arranged consecutively in a vertical direction, wherein the light source driver includes a plurality of driving devices, each of the plurality of driving devices corresponding to a respective group of the plurality of groups, and a light source circuit board, on one surface of which the light source array is mounted and on an opposite surface of which the plurality of driving devices are mounted, and wherein each of the plurality of driving devices is disposed to overlap at least one block of a group excluding the respective group corresponding to the driving device, and to not overlap blocks of the respective group corresponding to the driving device.

2. The display device of claim 1, wherein the blocks belonging to a same group are arranged such that a number of consecutive blocks in a horizontal direction is fewer than a number of consecutive blocks in the vertical direction.

3. The display device of claim 1, wherein the blocks belonging to a same group are arranged not to be consecutive in a horizontal direction.

4. The display device of claim 3, wherein the blocks belonging to the same group are arranged such that a predetermined number or more of blocks are not consecutive in the horizontal direction.

5. The display device of claim 1, wherein the plurality of driving devices is arranged in a line.

6. The display device of claim 1, wherein the plurality of driving devices is arranged in a line while each of the plurality of driving devices does not overlap the blocks of the respective group corresponding to the driving device.

7. The display device of claim 1, wherein a plurality of signal transfer connectors is formed on the light source circuit board, and wherein the plurality of signal transfer connectors is arranged in different directions.

* * * * *